J. S. AU BUCHON.
TIRE PROTECTING SHOE.
APPLICATION FILED DEC. 13, 1920.
1,406,962. Patented Feb. 21, 1922.
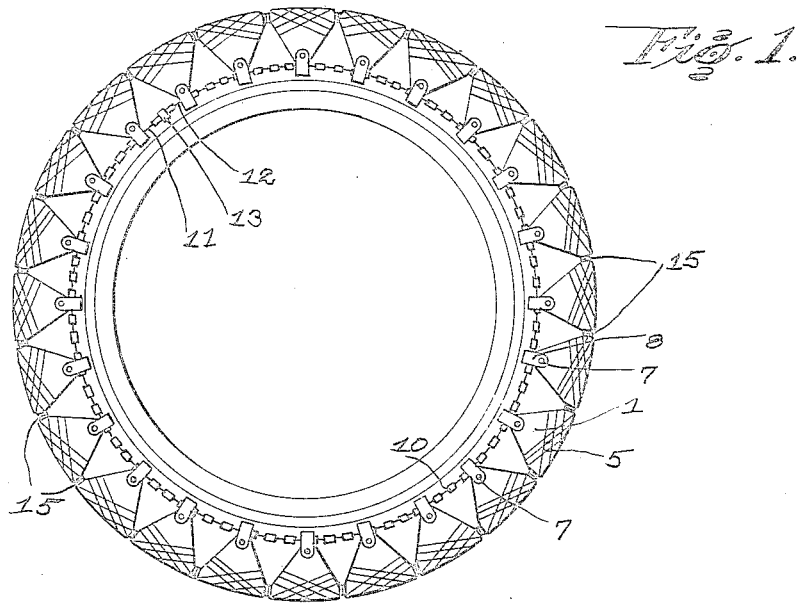
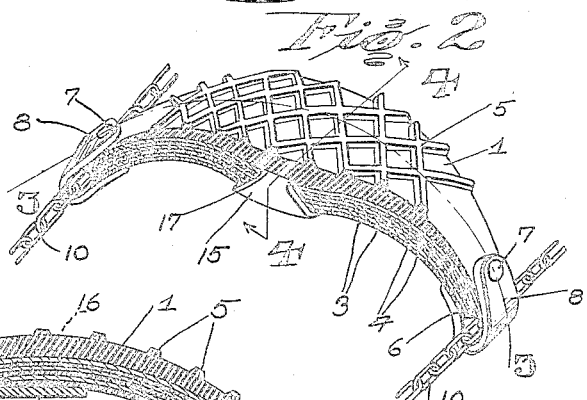
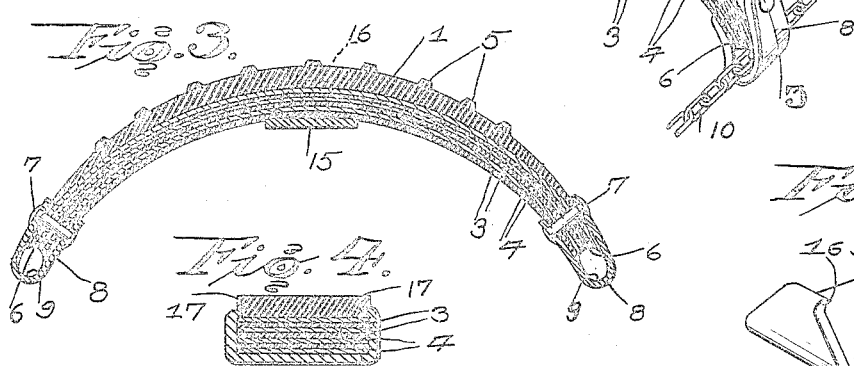
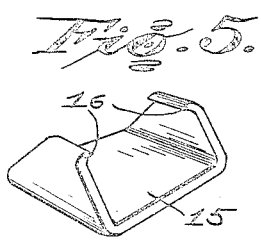
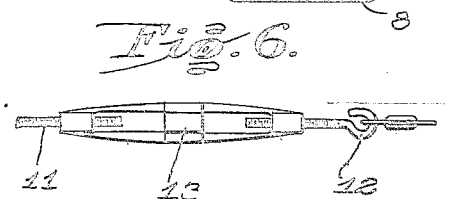
John S. AuBuchon
INVENTOR.
BY
Watson E. Coleman
ATTORNEY.

UNITED STATES PATENT OFFICE.

JOHN S. AU BUCHON, OF FARMINGTON, MISSOURI.

TIRE-PROTECTING SHOE.

1.406,962. Specification of Letters Patent. Patented Feb. 21, 1922.

Application filed December 13, 1920. Serial No. 430,332.

*To all whom it may concern:*

Be it known that I, JOHN S. AU BUCHON, a citizen of the United States, residing at Farmington, in the county of Saint Francois and State of Missouri, have invented certain new and useful Improvements in Tire-Protecting Shoes, of which the following is a specification, reference being had to the accompanying drawings.

The purpose of the present invention is to provide a protecting shoe of this character of any suitable contour and proportions, particularly adapted for use in connection with a tire, thereby not only affording a protecting tire tread but also serving as an extricator, to be applied to the wheel, or to be disposed on the road bed, to permit the wheel to ride thereon, so as to extricate the wheels of an automobile from the mud.

Another purpose is to provide a device of this character especially adapted to be constructed from an old discarded tire, and designed to withstand all the wear, which is usually subjected to the tire.

Still another purpose consists in the provision of a protecting shoe including the centrally disposed metallic wear plate, to be used between the protecting shoe and the surface of the tire, thereby acting to render the tire puncture proof, due to the fact that should a sharp pointed member pass through the protecting shoe, it will contact with the metallic plate, and prevent the member from entering the tire. As a rule members which act to puncture a tire are no longer than the thickness of the shoe, therefore should a member pass between any two wear shoes, particularly at points where the metallic puncture proof plates of any two shoes adjoin, the member will simply pass between the plates, and not reach the tire. Even though the member may be a trifle longer than the thickness between the thickness of the shoe, the extra length will not be long enough to puncture the tire to a degree which will cause serious damage to the tire.

A further purpose embodies a protecting shoe which has been found very durable, simple and practical in construction, and which can be made very cheaply, owing to the same being constructed from old discarded tires, and which can be sold at a reasonable profit.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in side elevation of an automobile tire, showing the tire protecting shoe as applied thereto, there being sufficient number to extend about the entire tread surface of the tire.

Figure 2 is a detail perspective view of one of the protecting shoes constructed in accordance with the invention.

Figure 3 is a sectional view on line 3—3 of Figure 2.

Figure 4 is a sectional view on line 4—4 of Figure 2.

Figure 5 is a detail view of the metallic or steel protecting plate.

Figure 6 is a detail view of the turn-buckle.

Referring more especially to the drawings, 1 designates the tire protector and tread as a whole, and which comprises a plurality of shoes connected in sequence, to engage about the tread surface of the tire.

Each shoe is designed to be constructed from old discarded tires, though it may be constructed of a specially prepared composition of rubber and canvas, as the case may be.

In either case the protecting shoe comprises a series of layers of rubber and canvas, as indicated at 3 and 4, and adjacent the outermost layer of the canvas, each shoe is provided with a heavy layer or thickness of rubber, especially prepared for use in connection with the canvas, and each outer layer of rubber has on its outer surface a plurality of intersecting ribs 5, acting to insure the protector against skidding.

As previously stated the protecting shoe may be made any suitable contour, preferably of the shape shown, the canvas being disposed closer to the tire than to the outer rubber surface of the shoe, thereby more or less additionally protecting the tread of the tire.

Fastened to the shoe in any suitable manner, preferably by rivets to the extremities of the end portions 6 (which extend radially on opposite sides of the tire) as at 7 are U- shaped plates or clamps 8. The loop portions 9 of the clamps or plates 8 receive the holding chains 10, which are disposed adjacent the opposite sides of the tire, at points where the tire connects with the rim of the wheel. These chains may be dispensed with, and cables (not shown) used in their stead. In fact any suitable rope may be used instead of the cables, though the cables and the chains are thought to be most preferable.

Each chain has one end connected permanently to a hook of a rod 11, while the opposite end of the chain is connected to a second rod 12, there being a turn-buckle 13 connecting the two rods, so that by rotating the turn-buckle in one direction or the other, the chain may be tightened or loosened, thereby either holding the series of shoes in place loosely, or tightly. The fastening means 7 act to permit the plates to move slightly pivotally, during the action of the wheel. Furthermore the shoes may be adjusted on the chains, provided the shoes are arranged with spaces between them. In this case the shoes will act to move in one direction or the other relatively to the tire, it depending whether or not the wheel is operated forwardly or rearwardly.

Interposed between each shoe and the tread surface of the tire is a metallic plate, preferably constructed of steel, and forming an integral part of the plate 15 are hooks 16, which are curved and extend toward each other as shown. These hooks act to engage in the opposite edges of the protecting shoe, as indicated at 17, thereby holding the plates in position. The hooks are sufficiently long to engage at points slightly inwardly of the relatively thick rubber surface of the shoe, in fact at points about where the canvas joins the outer thickness of rubber, so as to engage a relatively strong part of the shoe, in order to prevent detachment of the plate. The hooks 16 of the plates 15 constitute abutments, owing to their outer adjacent faces engaging, when the series of shoes are applied to a tread surface of a tire, thereby preventing wear on the edges of the shoes proper. In other words the shoes are adapted to be arranged on a tread surface of a tire in sequence so that their edges are closely adjacent each other, and since the shoes are constructed of such fibre material as rubber, canvas and the like, it is essential to provide some means to prevent the edges of the fibre from contacting, hence the provision of the hooks 16 which avoid wear. It will be noted that should a member penetrate the shoe, it will contact with the plate, and be prevented from entering the tread surface of the tire. It will be noted that the plate may be adjusted toward either end of the shoe, in order to suit the convenience of the person using the protecting shoe. In fact the plate cannot be adjusted to any great degree, for the reason that the plate is very liable to disconnect from the shoe, owing to the end portions of the shoe becoming narrow toward the opposite ends. In other words the shoe tapers toward its ends, therefore it is obvious that the plate cannot be adjusted excessively toward the ends of the shoe.

In using the protecting shoes in series as an extricator, the chain of shoes connected together as shown may be disposed on the road bed in front of the wheels, then the automobile may be operated until the wheels ride upon the series of shoes. After the rear wheels have reached the chain of shoes, one end of the chain of shoes may be attached to the rear wheels, and in this case the chain of shoes will roll about the wheels, thereby acting to extricate the automobile from the mud.

The invention having been set forth, what is claimed as being useful is:—

1. In a tire protecting device comprising a plurality of flexibly connected members of resilient material disposed circumferentially about a tire in close relation, means for preventing wear at the abutting edges of said members comprising U-shaped metallic elements disposed against the under sides of the members and having upturned ends embracingly engaging the edges of the members.

2. In a tire protecting device comprising a plurality of members arranged in edge to edge relation about the circumference of a tire and flexibly connected, means for preventing wear at the abutting edges of said members comprising a U-shaped metallic element associated with each member and extending transversely thereof with its bight portion disposed at the under side of the member and with its arms extending outwardly of the edges of the member, and means for holding the metallic element in position.

3. In a tire protecting device comprising a plurality of members arranged in edge to edge relation about the circumference of a tire and flexibly connected, means for preventing wear at the abutting edges of said members comprising a U-shaped metallic element associated with each member and extending transversely thereof with its bight portion disposed at the under side of the member and with its arms extending outwardly of the edges of the member, and means for holding the metallic element in position consisting of penetrating tines extending toward each other at the free ends of the arms and engaging within the material of the member.

In testimony whereof I hereunto affix my signature.

JOHN S. AU BUCHON.